April 14, 1964 K. SCHLICHTING 3,129,297

AIR SUPPORTED HOLDER FOR RECORDING AND REPRODUCING HEADS

Filed Oct. 25, 1961 2 Sheets-Sheet 1

April 14, 1964 K. SCHLICHTING 3,129,297
AIR SUPPORTED HOLDER FOR RECORDING AND REPRODUCING HEADS
Filed Oct. 25, 1961 2 Sheets-Sheet 2

United States Patent Office 3,129,297

Patented Apr. 14, 1964

3,129,297

AIR SUPPORTED HOLDER FOR RECORDING AND REPRODUCING HEADS

Kurt Schlichting, Kiel, Germany, assignor to Zeiss Ikon Aktiengesellschaft, Stuttgart, Germany Filed Oct. 25, 1961, Ser. No. 147,619
Claims priority, application Germany Nov. 2, 1960
2 Claims. (Cl. 179—100.2)

This invention relates to an air supported holder for recording and reproducing heads particularly for impulse recording and impulse reproduction on magnetic or electrostatic record carriers.

It has been proposed heretofore to floatingly support a holder of the type mentioned by means of an air cushion in a position closely above a record carrier. The purpose of such an arrangement is to move the recording head and the reproducing head, respectively, as closely as possible toward the record carrier so that any vibration errors caused for instance by a non-uniform recording layer or by a faulty mounting of the same may be taken care of.

In one group of these known arrangements the supporting air cushion is produced by a supply of compressed air, while in another group which employs drum-shaped record carriers the tangential air current is employed which is produced by a rapid rotation of the drum, whereby this air current is directed against the holder serving as a carrier for the recording and reproducing heads. The last named arrangement is devoid of any compressed air conduits and eliminates any damage which may occur when for instance a sudden cessation of the compressed air takes place.

In both of these known arrangements it is necessary to provide means which urge the holder against the produced air cushion and which maintain the holder in the required distance from the record carrier. On the other hand, there must be provided also means which prevent that the holder with its recording head or reproducing head, respectively, drops upon the record carrier when one of the conditions necessary for the formation of the air cushion, such as a sufficiently high speed of the drum or a sufficiently high air pressure, is not fulfilled. The forces which must act in opposite direction in these arrangements require certain details of construction and are relatively complicated and therefore expensive.

It is an object of the present invention to eliminate these disadvantages of the prior art devices and to obtain in addition thereto certain advantages. The present invention provides that the surface of the holder which faces the record carrier is provided with recesses and projections, respectively, which have the effect that when the record carrier moves with high speed past the holder, there are produced between the record carrier and the opposing surface of the holder zones of increased air pressure and zones of low air pressure. The effect of these zones upon the holder is that the pressures existing between the mentioned surfaces of the holder and the record carrier equalize each other. This includes also all other forces, such as the gravity of the holder and the effects of springs, which all contribute to obtaining a balanced condition among the several parts.

Other objects of the invention will be apparent from the following description with reference to the drawings which disclose a specific embodiment of the invention.

Figure 1:
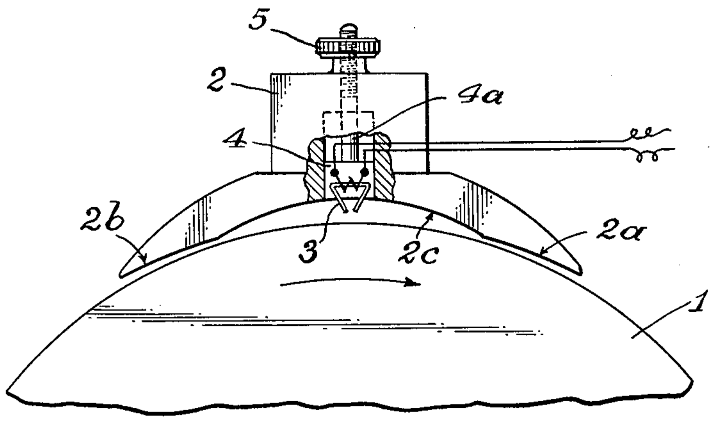
FIG. 1 illustrates diagrammatically a portion of a recording drum with a floatingly mounted holder above the surface of this drum.
Figure 2:
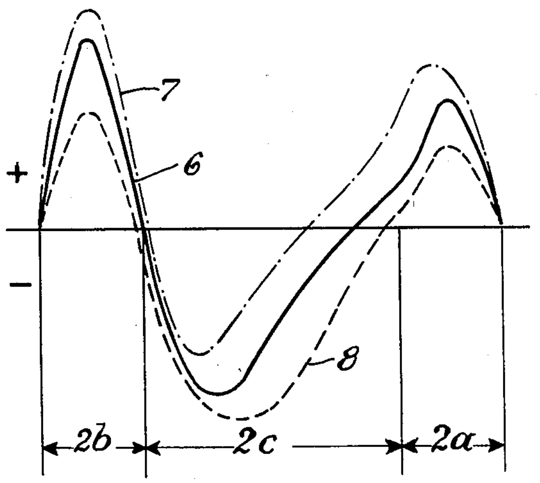
FIG. 2 illustrates diagrammatically the pressure conditions in the arrangement of FIG. 1.

Referring to FIG. 1, a rapidly rotating recording drum 1 has floatingly arranged above the same at a very small distance a holder 2 which has mounted therein a magnetic sound recording head 3. The latter is attached to a carrier 4 which is slidably adjustably mounted in the holder 2. The carrier 4 has attached thereto an upwardly projecting screw spindle 4*a* on the outer end of which is mounted an adjusting nut 5 which permits a slidable adjustment of the carrier 4 relatively to the holder 2. The surface of the holder 2 which faces the recording drum 1 is provided with end zones 2*a* and 2*b*, the curvature of which is somewhat less than the curvature of the recording drum. Between these two end zones 2*a* and 2*b* the holder 2 has a central zone 2*c*, the curvature of which is substantially greater than the curvature of the recording drum. This shape of the surface of the holder 2 which faces the surface of the recording drum 1 has the result that when the drum 1 rotates quickly, the pressure conditions between the drum 1 and the holder 2 have the characteristic as shown in FIG. 2. Within the zones 2*a* and 2*b* there is created a super-pressure which, when the distance between the drum 1 and the holder 2 is correct, will be equal to the negative pressure produced within the zone 2*c* so that all the pressures are balanced.

The characteristic shown in FIG. 2 in a full line 6 indicates this balanced condition. If, however, the holder 2 is moved too close toward the surface of the recording drum 1, then the pressure conditions change in favor of the super-pressure in the range of the zones 2*a* and 2*b*, as shown in a dashed and dotted line 7 in FIG. 2. This means that the air cushion has the tendency to push the holder 2 away from the drum toward the balanced position. If on the one hand the holder 2 is moved too far away from the recording drum 1, then the pressure conditions will be in favor of the reduced pressure in the zone 2*c*, as shown in the dashed line 8 in FIG. 2. The result is that the holder 2 will be pulled toward the recording drum 1 until the balanced condition is again established.

Figure 3:
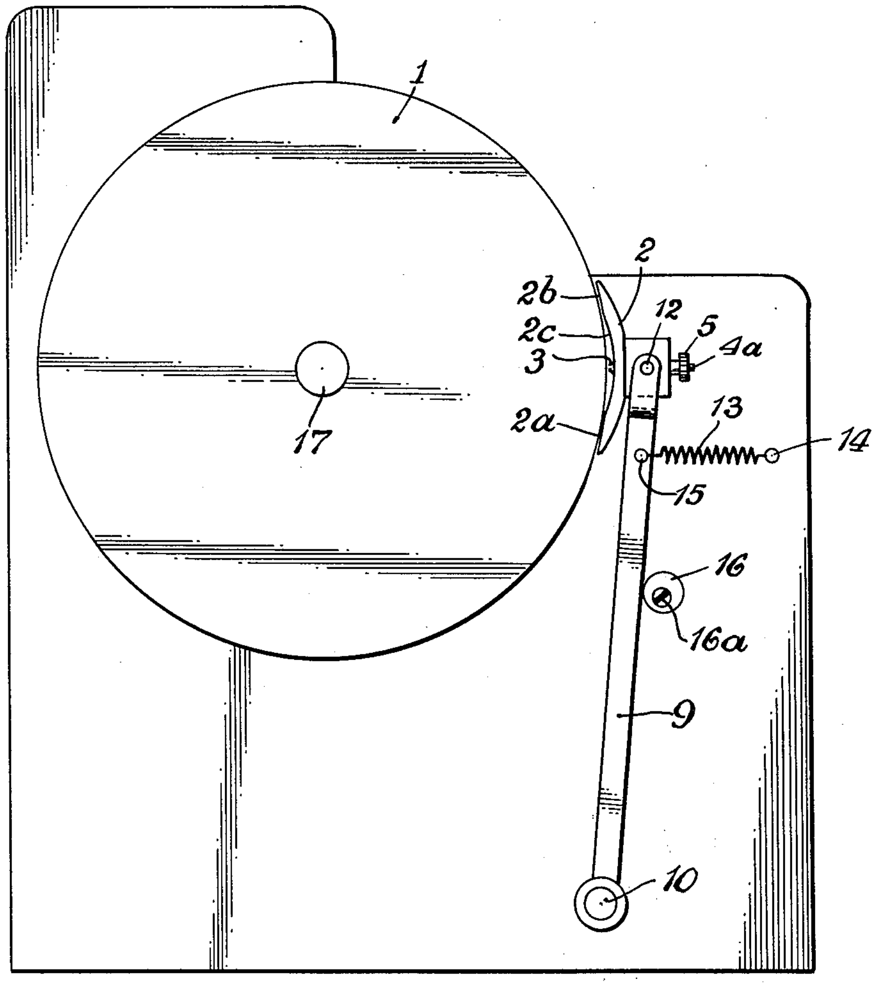
FIG. 3 illustrates a side elevation view of the arrangement of the invention.

FIG. 3 illustrates an arrangement in which the recording drum 1 and the holder 2 with the magnetic sound recording head 3, as shown in FIG. 1, is mounted in the upper forked end of a lever 9, the lower end of which is pivotally mounted on a horizontal shaft 10 in the frame 11 of the device. The upper forked end of the lever 9 is pivotally attached to two opposite points of the holder 2 by the bolts 12. A helical spring 13 is connected with one end to a pin 14 on the frame 11 and with its other end to a pin 15 on the forked lever 9 and urges the latter constantly against a stop 16 which is adjustably mounted on the frame 11. The position of the forked lever 9 as shown in FIG. 3 corresponds to the rest position in which the spring 13 urges the lever against the stop 16 and this is the condition when the device is inoperative or when the drum 1 rotates only slowly. The stop 16 may consist of an eccentric disc rotatably adjustable about the axis of a pivot pin 16*a* attached to the frame 11. The lever 9 is urged by the spring 13 against the adjustable circumference of the eccentric disc 16.

When the recording drum 1 rotates with sufficient speed around its horizontal supporting axis 17, then the low pressure within the zone 2*c* between the surfaces of the holder 2 and the circumference of the drum 1 assumes such a value that the holder 2 is pulled toward the surface of the drum 1 until a balanced condition is obtained between the low pressure in the central zone 2*c* and the super pressure in the end zones 2*a* and 2*b* and the action of the spring 13. With the assistance of the adjustable stop 16 the distance between the holder 2 and the surface of the drum 1 may be so adjusted that the holder 2 upon the attainment of the desired speed of the drum will be pulled toward the drum by the tangential air current.

Owing to the particular form of the surface of the holder 2 which faces the surface of the recording drum 1 the distance between the drum and the holder 2 may be maintained within very small limits. This distance is determined by the particular form of the effective surface of the holder 2 and the tension of the spring 13 and may be changed only upon application of a substantial amount of power. This property permits an adjustment of the magnetic head 3 with the assistance of the adjusting nut 5 to a position very close to the surface of the recording drum 1. This is an advantage which in spite of the small number of elements employed in this device assures a very good recording and reproduction of the signals.

The spring 13 prevents a slidable engagement of the holder 2 with the surface of the drum when the circumferential speed of the latter should drop. As soon as the low pressure acting in the zone 2*c* becomes too low as a result of the reduced speed of the drum, the holder 2 will be moved away from the drum until the lever 9 engages the stop 16.

What I claim is:

1. In combination with an air supported holder for recording and reproducing heads, particularly for impulse recording and impulse reproducing, a rotatable magnetic record carrier having a circular recording surface, in which the surface of said holder facing the circular recording surface of said record carrier is provided with a recess and projections which upon rotation of said record carrier produce in the gap formed between the latter and the holder zones of increased air pressure and of reduced air pressure, said recess being arranged in the central portion of the surface of the holder which faces the recording surface of said record carrier and being formed by a concave depression whose curvature is greater than that of said circular recording surface, while the end portions of said surface of the holder form said projections which have a curvature which is smaller than the curvature of said circular recording surface.

2. In combination with an air supported holder for recording and reproducing heads, particularly for impulse recording and impulse reproducing, a rotatable magnetic record carrier having a circular recording surface, in which the surface of said holder facing the circular recording surface of said record carrier is provided with a recess and projections which upon rotation of said record carrier produce in the gap formed between the latter and the holder zones of increased air pressure and of reduced air pressure, said recess being arranged in the central portion of the surface of the holder which faces the recording surface of said record carrier and being formed by a concave depression whose curvature is greater than that of said circular recording surface, while the end portions of said surface of the holder form said projections which have a curvature which is smaller than the curvature of said circular recording surface, and including a forked lever, means for pivotally mounting said holder in the fork of said lever, means for pivotally mounting the other end of said lever, and spring means attached to said lever for urging the latter in a direction in which said holder is moved away from said record carrier.

References Cited in the file of this patent

UNITED STATES PATENTS 2,862,781 Baumeister ______________ Dec. 2, 1958